United States Patent [19]
Gilcreast

[11] Patent Number: 5,171,395
[45] Date of Patent: Dec. 15, 1992

[54] SHAPED MOLD-IN

[75] Inventor: David Gilcreast, Contoocook, N.H.

[73] Assignee: Velcro Industries B.V., Netherlands

[21] Appl. No.: 565,451

[22] Filed: Aug. 9, 1990

[51] Int. Cl.⁵ .................. B29B 11/14; B32B 3/06; B29C 67/20
[52] U.S. Cl. .................. 156/500; 156/245; 156/79; 264/46.4; 428/100
[58] Field of Search .................. 156/66, 72, 78, 79, 156/242, 245, 500; 264/46.4, 46.7, 275, 277; 24/444, 447, 448; 428/100, 85, 86, 88, 95, 96, 99, 120, 192; 297/DIG. 1, DIG. 2, 219

[56] References Cited

U.S. PATENT DOCUMENTS

| | | |
|---|---|---|
| 4,470,857 | 9/1984 | Casalou . |
| 4,563,380 | 1/1986 | Black . |
| 4,673,542 | 6/1987 | Wigner . |
| 4,693,921 | 9/1987 | Billarant et al. . |
| 4,710,414 | 12/1987 | Northrup et al. . |
| 4,726,975 | 2/1988 | Hatch . |
| 4,842,916 | 6/1989 | Ogawa et al. .......... 24/444 |

FOREIGN PATENT DOCUMENTS 1-317721 12/1989 Japan ..................... 156/78

Primary Examiner—Michael W. Ball
Assistant Examiner—Nancy T. Krawczyk
Attorney, Agent, or Firm—Hayes, Soloway, Hennessey & Hage

[57] ABSTRACT

In a device for incorporating a separable fastener in a foamed seat cushion during formation of the cushion in a mold, includes a sheet having fastener elements constituting one half of a touch fastener. A foam wall surrounds the fastening surface, the wall having a height considerably greater than the height of the fastening elements. The fastener is held on a pedestal having a predetermined height extending into the mold volume and having a predetermined cross sectional dimension generally parallel to the interior mold surface as measured at a predetermined distance from said mold surface. The foam wall defines an opening which engages the sides of said pedestal with a force sufficiently strong to resist any removal force caused by tendency of the foaming action to lift the foam wall during creation of the cushion and bonding of the forming cushion to the foam wall.

10 Claims, 5 Drawing Sheets

SHAPED MOLD-IN

BACKGROUND OF THE INVENTION

This invention relates to an improved device and method for adapting separable fasteners, particularly those of the hook and loop type, for attachment to other objects such as polyurethane foam seat cushions for automobiles, furniture and the like. In this method one portion of a separable fastener is incorporated into the foam object during the molding process for subsequent attachment to another object carrying the mating portion of the separable fastener. The fastener of this invention provides a greater degree of design flexibility both as to shape and depth of structure than prior art products.

DESCRIPTION OF THE PRIOR ART

Hook and loop separable fasteners, such as those sold by the assignee of this application under the trademark VELCRO® are well-known and used to join two members detachably to each other. This type fastener has two components. Each has a flexible substrate or sheet having one component of the fastening system on the surface thereof. One surface is typically comprised of resilient hooks while the other is comprised of loops and when the two surfaces are pressed together they interlock to form a releasable engagement.

Separable fasteners have in recent years been used in the manufacture of automobile seats, in the attachment of an upholstered seat cover, hereinafter called trim cover, to a polyurethane foam bun. One portion of the separable fastener is incorporated into the surface of the polyurethane seat bun during the foam molding process. The mating portion of the separable fastener is attached to the seat cover to provide releasable attachment to the foam seat bun. The separable fastener assembly used in the foam mold for incorporation in the bun surface typically comprises the hooked portion of the separable fastener system. This hook portion is characterized by a substrate carrying resilient hooks on one surface. The other surface of the substrate may act as an anchoring surface by a variety of methods well-known in the art. In some assemblies a magnetizable shim is often attached to the substrate to facilitate placement of the assembly in a trough of the mold cavity wall, which is equipped with magnets. A protective layer, usually in the form of a thin plastic film, may be placed over the resilient hooks to prevent incursion of foam into the hooks during the molding process, since significant foam contamination of the hooks would affect the ability to engage with the mating portion of the fastener attached to the seat trim cover. Fastening devices are applied to one surface of a clamshell mold; a chemical mixture, usually of a diisocyanate and a polyol, are injected into the mold; the upper surface of the mold is closed and clamped shut while the chemicals react and blow to form a flexible foam, well-known in the art.

The present state of the art relating to the attachment of such fastener means to foamed seat cushions and the like is generally represented by French patents 2,405,123, 2,423,666 and 2,466,330 as well as the following U.S. patents:

U.S. Pat. No. 4,470,857, issued Sep. 11, 1984 in the name of Stephen J. Casalou and assigned to R. A. Casalou, Inc.;

U.S. Pat. No. 4,563,380, issued Jan. 7, 1986 in the name of Philip D. Black and assigned to Minnesota Mining and Manufacturing Company;

U.S. Pat. No. 4,673,542, issued Jun. 16, 1987 in the name of Lauren R. Wigner and assigned to General Motors Corporation;

U.S. Pat. No. 4,693,921, issued Sep. 15, 1987 in the name of Patrick J. Billarant and Bruno Queval and assigned to Aplix;

U.S. Pat. No. 4,710,414, issued Dec. 1, 1987 in the name of Walter E. Northrup and Maurice E. Freeman and assigned to Minnesota Mining and Manufacturing Company;

U.S. Pat. No. 4,726,975, issued Feb. 23, 1988 in the name of Richard N. Hatch and assigned to Actief N. V.

U.S. Pat. No. 4,842,916, issued Jun. 27, 1989 to Kunihiko Ogawa et al assigned to Kuraray Company Ltd., Kurashiki, Japan.

Such mold-in separable fastener assemblies presently in use, while proving to be superior means of attaching a seat cover to a foam bun, have presented several problems. One disadvantage of the separable fastener assemblies of the type disclosed in U.S. Pat. No. 4,673,542 is that the thin plastic film layer used to cover the hooks must be removed after the mold-in process, thus requiring an additional and somewhat painstaking step in the manufacture of the foam seat bun. It also requires an additional component in the manufacture of the assembly which must be attached to the separable fastener tape with an adhesive. In addition, an adhesive-backed tape is usually affixed to the film layer to assist in its removal. Other prior-art assemblies, including those disclosed in U.S. Pat. Nos. 4,726,975, 4,563,380 and 4,693,921 also employ a thin layer of film to prevent the incursion of foam into the projections of the separable fastener portion during mold-in.

French Patent 2,423,666 discloses a system for sealing the edges of the tape in the mold trough by jamming the edges into the trough. It is not believed that this system, which is particularly shown in FIG. 3 of the French patent, ever achieved any commercial success. French Patent 2,466,330 shows a fastening strip mounted, by some undefined means, probably an adhesive, on a spline positioned on the mold wall so as to extend into the interior of a mold cavity.

An additional disadvantage of most of the prior art products is that they are essentially straight, flat, thin, two dimensional parts intended to conform to the surface of the seat bun. The assignee of this application practices a modification of these limitations of the prior art by cutting segments of the flat straight strips and fitting them together in a way that they form shapes such as chevrons, wings or diagonals, said strip segments being held together by staples. Such assemblages, however, are incapable of forming smooth or sweeping curves which provide the fashion flexibility sought by designers. Neither do the flat two dimensional strips provide the capability for deep sculptured designs as described in pending U.S. patent application Ser. No. 07/475,687 filed Feb. 6, 1990 assigned to the assignee of this application. Heretofore, attempts to alter the seat appearance to achieve sculptured looks had to be accomplished through painstaking and expensive sewing of the trim cover. This is accomplished by the inclusion of special block of foam and seams arranged to provide the desired appearance after the trim cover is attached to the seat bun. But even with this method it is difficult to achieve certain desirable flowing or sweeping designs with a deep sculptured appearance.

BRIEF SUMMARY OF THE PRESENT INVENTION

In the present invention there is provided a novel fastener which, as in the prior art products, carries on one surface an area of outwardly extending fastener elements, preferably hooks. These fastening elements constitute one half of a touch fastening system. The other half of the fastening system is attached to the decorative upholstery constituting the outer decorative shell of the seat. Unlike prior art devices, however, the present invention utilizes a layer of precast foam to be positioned over a portion of the face of the fastening elements intended to be attached to the seat bun. The fastening elements are exposed by cutting out a portion of the precast foam layer or molding an opening in the desired shape into the cast foam. The foam layer may be shaped into any desirable shape by casting, cutting, sculpting or otherwise removing appropriate sections. The periphery of the sculpted foam slab is attached to the fastener by appropriate means, as will become clear below. The opening in the precast foam provides a wall which defines the design to be incorporated into the seat bun. When the device is affixed to the mold by sliding the foam wall over a pedestal having a predetermined height extending into the mold volume and having a predetermined cross sectional dimension generally parallel to the interior mold surface as measured at a predetermined distance from said mold surface. The foam wall preferably defines an opening which engages the sides of said pedestal with a force sufficiently strong to resist any removal force caused by tendency of the foaming action to lift said foam wall during creation of said cushion and bonding of said forming cushion to said foam wall. To achieve this engagement with the pedestal, the foam wall preferably defines an opening which is smaller than said predetermined cross sectional dimension of said pedestal. This engagement is controlled by a number of factors such as height of wall (area of engagement), density of foam wall and size of opening relative to size of pedestal. The required engagement force is controlled by the nature of the foaming reaction and the resultant lifting force due to the seatbun foam formation.

The foam also provides protection for the fastener elements against contamination from the liquid molding chemicals without the need for protective covers. The mold-in device may be thick or thin or sculpted in any desirable set of tight or sweeping curves. It may be sculpted to have differing depths throughout its shape.

The sculpted foam may be affixed to the fastener sheet by any of the methods well-known in the art such as gluing, fusing, welding and the like or, alternatively, by engagement with a sheet of loop material laminated to the precast foam prior to sculpting.

The preferred outwardly facing hooks are positioned under the shaped foam and form a laminate with it. As viewed in the foamed seat bun, the hooks are located at the bottom of a trench formed by the cutout foam. After molding, the entire assembly forms an integral part of the seat giving the appearance of having been molded in the desired design as a part thereof, with the outwardly facing fastener elements disposed over the entire base of the opening formed in the precut foam.

After the seat bun is formed, the upholstered trim cover, containing on its inner surface companion fastening elements, is affixed to the bun by means of the incorporated mating element. The hook and loop closure firmly hold the two components together against slippage or distortion of the trim cover in service.

BRIEF DESCRIPTION OF THE DRAWINGS

In order to more fully understand the invention, reference is made to the following detailed drawings.

DESCRIPTION OF THE PREFERRED EMBODIMENT

Figure 1:
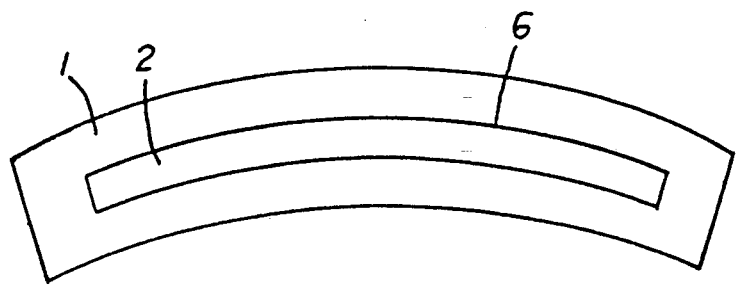
FIGS. 1 and 1a are plan views of two embodiment of the invention.
Figure 1A:
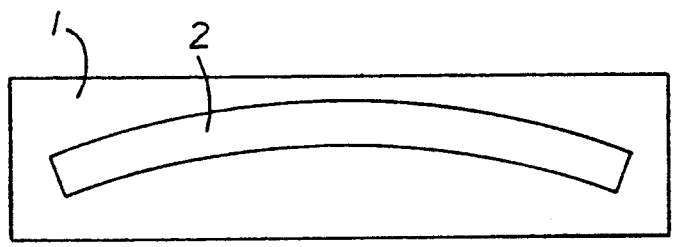
Figure 2:
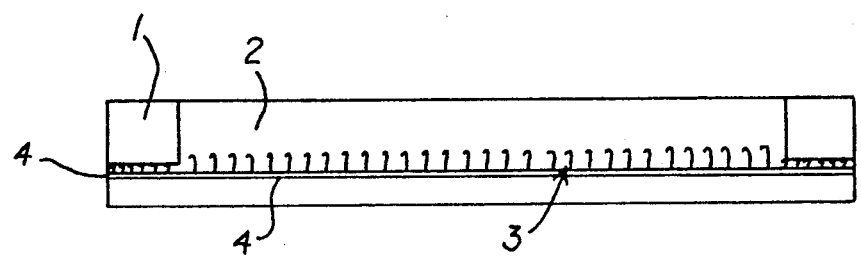
FIG. 2 is a cross section through FIG. 1 taken along line A-A'.

Referring now specifically to the drawings, FIG. 1 is a plan view of the device of this invention wherein a slab of foam, preferably polyurethane, is cut to an overall curved shape with an inner portion cut out to form an opening (2) through which a strip of fastener elements (3) are exposed. The foam (1) makes up the walls (6) which define the opening (2) and may be of any desired depth or width. The shape selected may be varied at will and the opening shape need not correspond to the outer shape of the foam slab permitting the wall thickness to vary as illustrated in FIG. 1A. A thin sheet of fastening elements (4) (FIG. 2) is affixed to the lower side of the foam slab along the periphery surrounding the opening. The hooking elements (3) on the fastener sheet (4) are disposed inwardly to the foam and the sheet carrying the fastener elements serve to cover the lower end of the opening. The hooks at the bottom of the opening which defines the trench will engage the companion loop elements positioned on the inner side of an upholstery trim cover after the device is cast into a seat bun (5).

The opening defined by the walls of the device is designed to impart the desired design feature to the seat. Prior to casting the seat bun (5), the shaped mold-in device is fitted over a pedestal (7) built into the mold as shown in FIG. 4. FIG. 4 depicts a plan view of the lower section of a mold (8), well-known in the art, containing the pedestal (7) of FIG. 3. The mold may include other hook and loop fastening devices (9) such as those of the prior art, held in place by magnets as described in U.S. Pat. No. 4,673,542 to Lauren R. Wigner et al.

Figure 3:
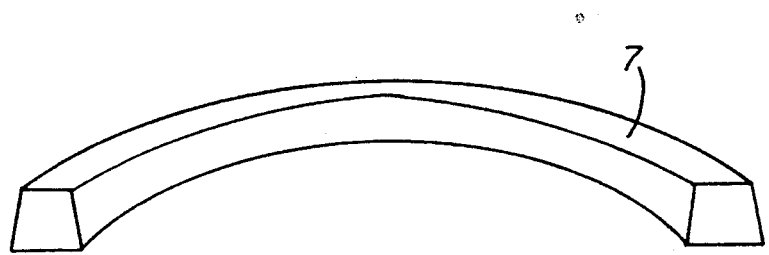
FIG. 3 is isometric view of a pedestal onto which the device of this invention is fitted in a mold.
Figure 4:
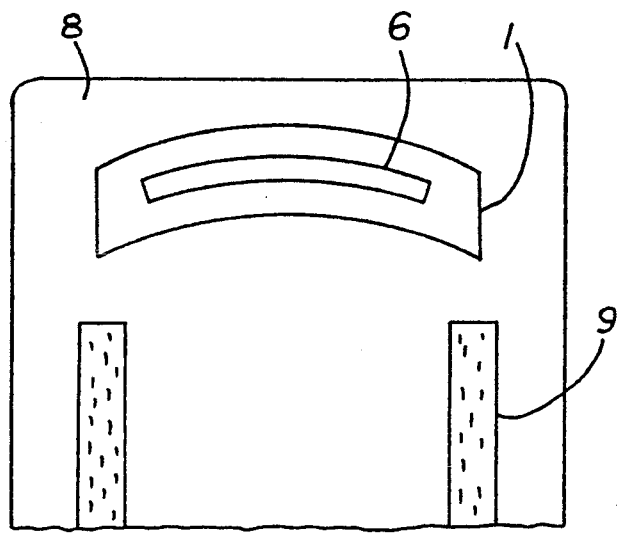
FIG. 4 is a depiction of a mold containing the pedestal illustrated in FIG. 3 in conjunction with provision to apply prior art fastener strips in the manner well-known in the art.

FIG. 3 depicts the pedestal (7) as a complex curve of dimensions designed to match the inner dimensions of a mold-in device, not shown. The mold-in device is placed over the pedestal (7) such that the wall surfaces (6) squeeze against the pedestal (7) and so that the foam wall surfaces (6) exert a slight pressure on the sidewalls (11) of the pedestal (2) (See FIG. 5). The fit is designed to furnish sufficient pressure to firmly retain the device in place throughout the foam seatbun pouring and foaming process. The engagement between the wall surfaces (6) and the sides (11) of the pedestal (7) also prevents the influx of liquid foaming chemicals into the opening (2).

Figure 5:
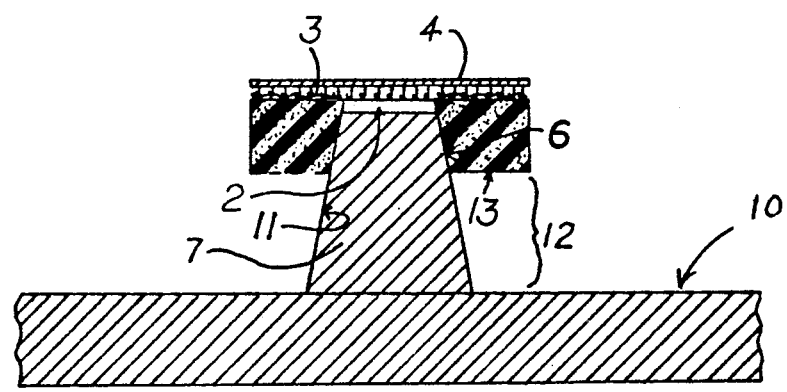
FIG. 5 is a cross section of the device of this invention fitted to the pedestal of FIG. 3.

The thickness of the foam defining the opening (2) can be made to match the height of the pedestal (7) or can be shorter or taller than the pedestal. If shorter than the pedestal, the space (12) would be created between the lower face (13) of the foam and the wall (10) of the mold (8) as shown in FIG. 5. This space (12) creates an undercut which allows the liquid foaming chemicals to flow under the outer surface of the device, the foam wall extending out from the pedestal prior to the foaming and before the seatbun foam begins to rise. As the chemicals start to react they raise to fill the space (12) entrapping the fastener within the newly created foam seatbun of the seat bun (5).

Care must be taken that the force of the rising foam seatbun does not lift the foam wall from the kpedestal. The fit of the mold-in device can be adjusted to exert greater or lesser force to assure that the device remains in its proper position or the height of the foam wall can be increased to provide greater holding force against the pedestal wall. It has been found that a force of 0.1 lbs. per inch of wall length satisfactorily holds the foam in place on the pedestal for many practical molding conditions. Where the lifting force of the foam seatbun is slight, a force of less than 0.1 can be satisfactory. However, if a high lifting force is created by the foam seatbun a holding force greater than 0.1 lbs. per inch of wall will be necessary. If desired the pedestal surface may be grooved or roughened to increase the frictional engagement with the foam wall.

Table I shows the force in pounds required to overcome the friction of a section of precast cutout foam against a rod shaped pedestal using various dimensions of height and width. Varying thickness foam slab were cut into blocks approximately 2.25" square. Holes of differing diameter were die cut through the foam slabs. The cut out foam slabs were placed over a smooth aluminum rod 1.25" in diameter, simulating a pedestal. The force in pounds to slide the foam over the rod were recorded using an Instron tensile tester. The first foam tested was a low density foam of 0.95 #/cu ft with a compressive resistance given as ILD 32. The second foam tested was classified as a high density foam of 2.8 #/cu ft with a compressive resistance given as ILD 45.

TABLE I (FORCE IN POUNDS TO REMOVE FOAM FROM 1.25" ROD)
(Low Density .95 #/cu ft)

| FOAM THICKNESS | HOLE DIAMETER | | | |
|---|---|---|---|---|
| | 1.375" | 1.25" | 1.125" | 1.00" |
| 0.25" | 0 | N/A | .08 | .11 |
| 0.50" | 0 | .01 | 0.2 | .31 |
| 1.00" | 0 | .02 | .39 | .71 |
| 2.00" | 0 | .02 | .92 | 1.41 |
| 3.00" | 0 | .62 | 1.05 | 1.95 |

TABLE II (FORCE IN POUNDS TO REMOVE FOAM FROM 1.25" ROD)
(High Density 2.8 #/CU/FT)

| FOAM THICKNESS | HOLE DIAMETER | | | |
|---|---|---|---|---|
| | 1.375" | 1.25" | 1.125" | 1.00" |
| 0.25" | 0 | .01 | .14 | .22 |
| 0.50" | 0 | .02 | .36 | .63 |
| 1.00" | 0 | — | .90 | 1.35 |
| 2.00" | 0 | .64 | 2.05 | 3.05 |
| 3.00" | 0 | .73 | 2.50 | 4.10 |

It is readily apparent the dimensions of the cutout shape relative to the dimensions of the pedestal will depend upon the compressive force of the foam. It is possible to appropriately apply any desired foam to a pedestal by selecting its dimensions to apply sufficient force to the pedestal over which it is placed. I have found that a wall height of between 0.25" and 4" and preferably between 0.5" and 2.0" to be very satisfactory for holding the device onto the pedestal in a practical molding situation for many foam slabs found suitable for practicing this invention. As can be apparent from the above tables, both height of foam wall, density of foam and size of opening each independently affects the removal force.

The foam acts to replace the anchors of prior art products. By carefully selecting the foam to be compatible with the liquid chemicals of the molding compounds, it is possible to achieve anchoring forces substantially greater than prior art products.

Employing the arrangement whereby the lower face of the mold-in device (13) is raised above the face of the mold wall (10), that is providing an undercut (12) to allow the seat foam to anchor the mold-in device into the bun, greater force is required to tear the part from the finished bun than would be achieved solely by adhesion of the two foams to one another as occurs when the trench walls are sufficiently deep to rest upon the face of the mold.

The space (12) between the wall of the mold and the surface of the mold-in device (13) adds to the depth of the trench in the finished seat bun. Thus, it is possible to achieve very deep trenches without the need for using very thick foam slabs to create the mold-in device.

The instant invention is not restricted to a single trench in each section of precut foam. Any combination of patterns may be cut through the foam slab and a single sheets of fastener elements attached to the cut foam to create the mold-in device. In this way very complex parts can be designed without the need for loading separately many individual fastener segments into the mold. The single part device of this invention offers advantages in manufacturing efficiency when loading parts into molds on a production line.

Now turning to the preferred method for creating the configuration of the mold-in device of this invention. A pattern is cut into a slab of polyurethane foam, of the desired thickness, using any of the methods well-known in the art such as rotary dies, clicker presses flat dies or the like. I have found it especially useful to utilize a foam which already has laminated to it a sheet of fastener elements, said elements being disposed outwardly from the foam. I prefer that a sheet of loop material be laminated to the foam but it is possible to laminate hook to the foam in the method contemplated. The choice will depend upon the selection of the fastener elements to be attached to the upholstery trim cover.

Figure 6:
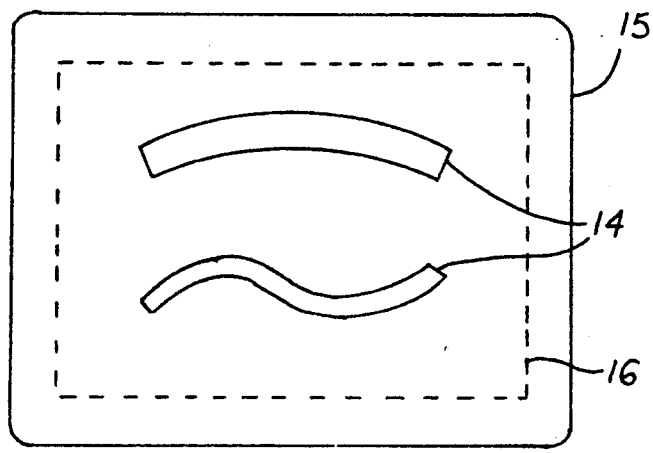
FIG. 6 illustrates a range of shapes molded into a single slab of foam forming the device of this invention.

For purposes of illustration, below, loop is laminated to the foam. By cutting the sections of the laminated foam through their entire thickness, including the attached loop elements, designs are formed in the slab. I then attach a sheet of hooks to the loops on the bottom face of the cutout foam. Alternatively, any appropriate adhesive may be used to attach the engaging elements to the foam slab. The hook elements are thus facing the foam, and in the sections cut out to create the trench, serve to close off the bottom of the trench with the hook elements disposed inwardly into the trench and in a position to engage loop elements on the trim cover. In this configuration, it will be realized the sheet of hook elements need not take on the shape of the trench nor even the overall shape of the device itself. In fact, it is not necessary to cover completely the underside of the foam; all that is required is sufficient overlap to permit engagement of the hook and loop around the periphery of the trench to adequately hold the hook elements in place with sufficient strength so as not to be pulled out when separating the trim cover as shown at 16 of FIG. 6. In general, I prefer the area of engagement to be at least equivalent to the area of the trench opening depending upon the relative engagement force of the loop of the trim cover to the engagement force of the loop laminated to the cut out foam slab. In any case, the engagement force between the foam slab laminate should exceed the engagement force between the device and the trim cover.

Figure 7:
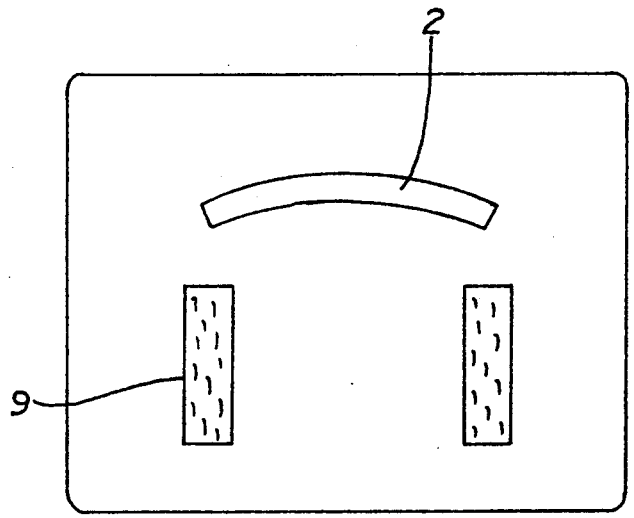
FIG. 7 is a plan view of a completed seat bun produced from the mold of FIG. 4.
Figure 8:
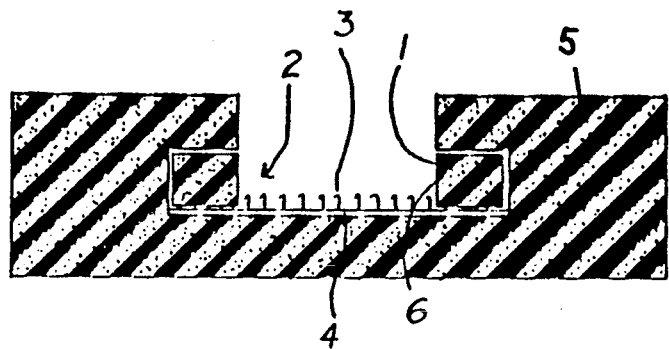
FIG. 8 is a cross sectional view of the seat bun of FIG. 7 along an arc through the bun along a trench formed therein from B to B'; and, FIG. 9 is the cross section view of FIG. 8 illustrating the attachment of the trim cover to the fastening elements of the device of this invention.
Figure 9:
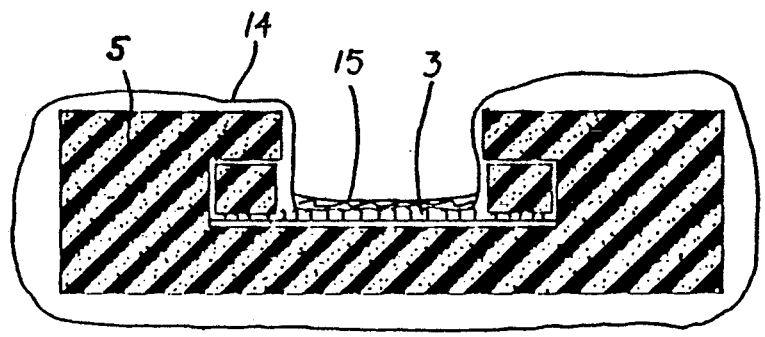

FIG. 8 shows a cross section of the seat bun of FIG. 7 along line B-B'. The trench (2) provides an opening with engaging elements (3) along its bottom surface (4). FIG. 9 illustrated the trim cover (14) engaged in place over seat bun (5) and engaged with elements (3) of the device of this invention with elements (15) attached to the trim cover. Any appropriate combination of engaging elements may be used for this purpose but I prefer hook elements be used in the seat bun and loop elements be used in the trim cover.

The following examples illustrate specific embodiments of the present invention.

EXAMPLE 1

A slab of polyurethane foam 8 inches by 6 inches and ½ inch thick laminated to a sheet of loop fastener elements, a commercial product sold by the assignee of the instant patent application under the trade name Velfoam ® 3953, was used as the base of a device for molding into the foam seat buns. A portion of the foam was cut out through the entire thickness of the foam and the loop sheet to form a crescent curve design. A sheet of plastic hook material, the same dimensions as the foam slab, 8 inches by 6 inches, was attached to the loop elements of the Velfoam ®. Alternatively it could be cut slightly larger than the outline of the cresent. The device was applied to a box shaped mold containing on its bottom face a pedestal of the shape of the cutout section of the foam slab except that the pedestal thickness was 1/16 inch greater than the dimensions of the opening in the foam. The height of the foam was slightly less than the 1.5 inch height of the pedestal. The device slid onto the pedestal with a slight resistance but it was possible to insert the piece to the full depth of the trench in the foam and the top of the pedestal was resting against the hook elements. The face of the device was resting approximately 1" above the face of the mold.

A mixture of chemicals used to create polyurethane foam seatbun consisting of MDI and a polyol and appropriate auxiliary ingredients was poured into the mold using a Cannon machine set for a pour time of 2 seconds. The lid of the mold was closed and the foaming chemicals allowed to react for a period of 10 minutes. The lid was raised, the foamed seat bun was removed from the mold. The density of the resulting product was approximately 2.5 lbs./cubic foot. The bun was crushed in a vacuum chamber through two cycles to release the blowing gases trapped in the foam seatbun cells and remove stresses in the poured bun which, unless released, will cause distortion of the bun shape.

The finished seat bun contained on its surface a trench in the shape of a crescent curve 1½ inch deep with hook elements disposed outwardly from the bottom of the trench. All edges of the hook element layer were buried in the composite foam seatbun structure, resisting removal of the hook layer from the bun.

With the above formulation the bond between the foam seatbun walls defining the opening and the pedestal was sufficient to prevent lifting of the device from the pedestal during the foaming operation.

I claim:

1. The combination of a separable fastener to be incorporated into a foamed seat cushion formed in a mold volume and a pedestal extending into the mold volume for holding said fastener during formation of said cushion by the foaming action created from chemicals charged into the open mold volume, the fastener comprising a sheet having on one surface thereof a plurality of fastening elements, constituting one half of a touch fastener system, and a foam wall surrounding said fastening elements, said wall having a height considerably greater than the height of said fastening elements and said foam wall defining an opening sized to fit over and engage the sides of said pedestal with a force sufficiently strong to resist any removal force caused by tendency of said foaming action to lift said fastener during creation of said cushion and bonding of said forming cushion to said foam wall.

2. The combination of claim 1, wherein said foam wall is at least 0.25 inch high.

3. The combination of claim 1, wherein said foam wall engages said pedestal with a force which requires at least 0.10 pounds per inch of wall length to remove the from the pedestal.

4. The combination of claim 1, wherein the height of the foam wall is less than the height of the pedestal and the outer vertical and horizontal sides of the foam wall are buried in the cushion foam to firmly bond the foam wall to the cushion foam.

5. The combination of claim 1, wherein the foam wall has a height of at least three times the height of the fastening elements.

6. The combination of claim 1, wherein the foam wall defines a curved opening which has a radius generally parallel to the plane of the fastener strip.

7. The combination of claim 1, wherein the frictional engagement of the foam wall on the sides of the pedestal constitutes the sole means for holding said fastener in place during foaming of the cushion.

8. The combination of claim 1, wherein a plurality of fastening elements are carried by a single piece of foam having a plurality of openings defining separate foam walls.

9. The combination of claim 1, wherein the fastening elements constitute hooks and the foam wall carries on, and bonded to, its bottom surface a layer of loops which engage the hooks to attach the foam wall to the fastener sheet.

10. The combination of claim 1, wherein the opening is at least 0.125 inch smaller than the cross section of the pedestal.

* * * * *